United States Patent [19]

Fujii et al.

[11] Patent Number: 4,529,632
[45] Date of Patent: Jul. 16, 1985

[54] TWO COAT ONE BAKE METHOD FOR SUBSTRATES WHICH HAVE METAL AND PLASTIC COMPONENT

[75] Inventors: Yasuhiro Fujii, Kanagawa; Masaru Mitsuzi, Zama, both of Japan

[73] Assignee: Kanzai Paint Company, Limited, Amagasaki, Japan

[21] Appl. No.: 673,003

[22] Filed: Nov. 19, 1984

[30] Foreign Application Priority Data

Dec. 2, 1983 [JP] Japan ................... 58-228879

[51] Int. Cl.$^3$ .............................................. B05D 3/02
[52] U.S. Cl. ..................................... 427/409; 427/402; 427/407.1; 427/412.1; 427/412.3; 427/426
[58] Field of Search .................. 427/402, 407.1, 409, 427/412.5, 412.1, 426, 412.3

[56] References Cited

U.S. PATENT DOCUMENTS

| | | | |
|---|---|---|---|
| 4,391,858 | 7/1983 | Batzill | 427/407.1 |
| 4,455,331 | 6/1984 | Barsotti | 428/446 |
| 4,456,647 | 6/1984 | Schönfelder et al. | 427/407.1 X |
| 4,463,038 | 7/1984 | Takeuchi et al. | 427/407.1 |
| 4,490,417 | 12/1984 | Shindow et al. | 427/388.3 |

*Primary Examiner*—Thurman K. Page
*Attorney, Agent, or Firm*—Larson and Taylor

[57] ABSTRACT

A method of coating automotive outer parts having components made of metals and of plastics by a system of two coating steps and one baking step, the method comprising coating the surface of the metal and plastics components with a single base coat composition; coating the base coat over the metal component with a clear topcoat composition prepared for metal components and the base coat over the plastics component with a clear topcoat composition prepared for plastics components; and thermally curing the base coat and the topcoats, the two topcoat compositions being capable of fulfilling the following requirements:

(i) the base resin for the topcoat composition for the metal components has a glass transition temperature higher by about 10° to about 100° C. than the base resin for the topcoat composition for plastics components; and (ii) (a) there is a difference of 0 to 4 dyne/cm in surface tension as measured upon application between the topcoat composition for metal components and the topcoat composition for plastics components; and/or (b) the topcoat composition for metal components contains 1 to 50 parts by weight of the base resin for the topcoat composition for plastics components per 100 parts by weight of the base resin for the topcoat composition for metal components and/or the topcoat composition for plastics components contains 1 to 50 parts by weight of the base resin for the topcoat composition for metal components per 100 parts by weight of the base resin for the topcoat composition for plastics components.

8 Claims, No Drawings

TWO COAT ONE BAKE METHOD FOR SUBSTRATES WHICH HAVE METAL AND PLASTIC COMPONENT

This invention relates to a coating method and more particularly to a novel method of applying finish coats to automotive outer panels and outer body components having constituents made of metals and those made of plastics.

Throughout the specification and claims, the outer panels and outer body components of automobiles which constitute the external portions of automobiles will be referred to as "automotive outer parts"; and the constituents made of metals and those made of plastics in automotive outer parts will be referred to as "metal component" and "plastics component".

The terms "automobile" and "automotive" as used in respect to automotive outer parts throughout the specification and claims refer not only to ordinary motorcars but also to a wide range of automotive vehicles including motorcycles, trucks, cars in use for safari, etc.

Once in the manufacture of automobiles, metals were mainly used as the materials for producing automotive outer parts, namely outer body components such as bumpers, facias and fenders, and outer panels such as door panels, hood panels, roof panels and trunk lid panels. However, in recent years, plastics have been replacing metals in producing the whole or part of these automotive outer parts. For example, bumpers and facias produced not from metals but from plastics, e.g., polyurethane, polypropylene or polycarbonate are available. Also such plastics are being used in making lower portions of fenders and door panels. The use of plastics is likely to increase in the manufacture of automotive outer parts. In fact, this tendency is marked in the production of roof panels, trunk lid panels and the like. The increased use of plastics is due to the advantages of plastics, for example, being capable of reducing the weight of automotive bodies, thereby saving expenses of gasoline consumed in running; being easily processed and thus moldable into a desired form; and giving automotive bodies improved corrosion resistance and impact resistance.

Despite this situation, however, effective methods for applying finish coats over automotive outer parts having metal and plastics components have not been developed. Conventionally the metal and plastics components of automotive outer parts have been separately given finish coats by methods comprising two coating steps and one baking step (hereinafter referred to as "2-coating- and 1-baking-step system"). With conventional methods, the metal and plastics components of automotive outer parts are coated in separate coating lines in which the metal and plastics components are coated each with different coloring base coat compositions, the base coats are covered each with different topcoat compositions and the base coats and topcoats are thermally cured, followed by fabrication of automotive outer parts from the metal and plastics components with the coatings thus cured. The conventional coating methods, however, have the drawbacks of (i) presenting great difficulty in forming layers of the same color over the metal and plastics components due to use of different coating compositions (particularly different coloring base coat compositions), and (ii) involving complicated coating and assembling procedures.

An object of the present invention is to provide a novel method of the 2-coating- and 1-baking-step system for coating automotive outer parts having metal and plastics components which method can overcome the drawbacks of conventional coating methods.

Another object of the invention is to provide an improved method of the 2-coating and 1-baking-step system for coating automotive outer parts having metal and plastics components which method is capable of giving finish coats to the assembled automotive outer parts in a single coating line so that the coating process is simplified and the need to assemble the outer parts after coating is eliminated.

A further object of the invention is to provide a method for coating automotive outer parts having metal and plastics components which method is capable of imparting the same color to the metal and plastics components by application of a single coloring base coat composition to the metal and plastics components.

A still further object of the invention is to provide a method for coating automotive outer parts having metal and plastics components which method is capable of giving markedly smooth-surfaced coatings free of cissing and indentation.

Other objects and features of the present invention will become apparent from the following description.

Our research has revealed that the drawbacks of conventional coating methods can be overcome and the objects of the present invention can be achieved by coating the metal and plastics components of assembled automotive outer parts with a single base coat composition to produce the same color over the metal and plastics components, covering portions of the base coat over the metal component and the plastics component separately with topcoat compositions formulated for the metal component and for the plastics component respectively and having specific properties or compositions to be described later, and thermally curing the base coat and the topcoats at the same time.

To achieve the foregoing objects of the present invention, the topcoat composition for the metal component (hereinafter referred to as "topcoating A") and the topcoat composition for the plastics component (hereinafter referred to as "topcoating B") must have the following properties or compositions:

(1) the base resin for the topcoating A has a glass transition temperature higher by about 10 to about 100° C. than that for the topcoating B, and (2) (a) there is a difference of 0 to 4 dyne/cm in surface tension between the topcoatings A and B, and/or (b) the topcoating A contains 1 to 50 parts by weight of the base resin for the topcoating B per 100 parts by weight of the base resin for the topcoating A and/or the topcoating B contains 1 to 50 parts by weight of the base resin for the topcoating A per 100 parts by weight of the base resin for the topcoating B.

The coating method of the present invention has the following feature: finish coatings are applied to automotive outer parts having metal and plastics components by the 2-coating- and 1-baking-step system in which automotive outer parts are assembled from the metal and plastics components prior to coating; a single base coat composition (coloring composition) is applied to the metal and plastics components; and top-coatings A and B having the foregoing specific properties or compositions are applied to the coated surface of the metal and plastics components respectively; and the base coat and the topcoats are thermally cured at a time. According to the present invention, a single base coat composition (coloring composition) is applied to the surface of the metal and plastics components of assembled automotive outer parts, followed by application of topcoatings A and B which are of a clear type. The application of these coating compositions enables the formation of the same color over the metal and plastics components and reduction in the number of coating treatments, hence simplification of coating process. Further because the topcoatings A and B are formulated according to the present invention to have the specific properties or compositions, the topcoatings A and B, even when formed side by side in contact, produce a coat boundary between the metal and plastics components in which the particles in the topcoatings are compatible with each other, giving a pronouncedly smooth coating surface free of cissing and indentation.

The automotive outer parts to be coated by the present method of the 2-coating- and 1-baking-step system are those having metal and plastics components, and including outer panels such as door panels, hood panels, roof panels and trunk lid panels, and outer body components such as bumpers, facias and fenders. The automotive outer parts to be covered also include those integrally formed of combinations of two or more of these outer parts each made of metal alone and made of plastics alone. The metal components are generally made of iron or an iron-containing alloy, and the plastics components are formed from polyurethane, polypropylene, polycarbonate, synthetic rubber or the like.

In applying finish coats to automotive outer parts by the 2-coating- and 1-baking-step system according to the present invention, it is preferred, when required, to subject the metal and plastics components to conventional surface treatment and pretreatment such as priming. According to a preferred method, the surface of metal component is treated with zinc phosphate, iron phosphate or the like, a primer of the anion or cation type such as polybutadiene-, polyester- or epoxy-containing one is electrodeposited on the surface-treated metal component, and an intermediate coat (e.g., amino-alkyd resin type coat) is applied to the primer coat. The plastics component is preferably surface-treated, for example, by degreasing with a solvent vapor, polishing, using an acid or corona discharge and then coated with a suitable primer.

According to the present invention, finish coatings are applied by the 2-coating- and 1-baking-step system to the surface of automotive outer parts which, if required, is pretreated in the conventional manner. More specifically, the coating method of the present invention comprises the steps of coating the metal and plastics components of automotive outer parts with the single base coat composition (coloring composition), covering the portions of the base coat over the metal and plastics components respectively with topcoatings A and B having the specific properties or compositions and curing the layers by heat treatment.

The base coat composition to be used in the present invention is a thermosetting coloring composition containing a coloring pigment and/or a metallic pigment to produce a solid color or metallic color in the finish coatings. Useful base coat compositions include those heretofore known and extensively used as base coat compositions for coating the steel and plastics portions of automobiles. Examples of useful base coat compositions are those of the organic solution type (including those of the high solid type and non-aqueous dispersion), water-based type or powder type which comprise, as the main components, (i) a vehicle containing a base resin such as acrylic resin, polyester resin or acryl-polyester resin, a cross linking agent such as amino resin, non-yellowing polyisocyanate (e.g., hexamethylene diisocyanate), and, when required, cellulose acetate butyrate, alkyd resin or the like which serves to improve the dispersibility of the pigment, and (ii) a coloring pigment and/or (iii) a metallic pigment.

Since the metal and plastics components of automotive outer parts are covered with a single base coat composition according to the present invention, the same color can be produced over the metal and plastics components. However, the application of a layer of the same composition to these components is likely to impair the physical properties of, or give a deteriorated finish appearance to, one of these components. To prevent such undesired change, it is preferred to produce a base coat as thin as possible, specifically about 10 to about 20μ, more suitably about 15 to about 20μ in dry thickness.

According to the present invention, the top-coatings A and B are applied to the surface of the base coat thus formed; namely the former is deposited on the base coat over the metal component and the latter on that over the plastics component. The topcoatings A and B are clear compositions of the thermosetting type capable of producing a transparent coat through which the color of the base coat is visible. Useful compositions are those of the thermosetting organic solution type (including those of the high solid type and non-aqueous dispersion) or water-based type containing a base resin, such as acrylic resin, polyester resin or acryl-polyester resin and a cross linking agent, such as amino resin or non-yellowing polyisocyanate (e.g., hexamethylene diisocyanate). When required, a coloring prgment and/or a metallic pigment can be incorporated into the compositions as far as the inclusion of the pigment does not reduce the transparency of the coatings. Topcoatings A and B are those which are compatible with each other.

According to the present invention, the top-coatings A and B have the following specific relationship with each other in respect of their properties or the compositions. When topcoatings A and B capable of meeting the following requirements (1) and (2) are applied to the base coat over the metal component and the plastics component of automotive outer parts according to the present invention, the formation of cissing and indentation can be prevented which otherwise would be caused by the particles of topcoatings mixed together at or near the boundary area between the metal and plastics components, whereby a finish over-coat having a smooth surface can be produced.

(1) Glass transition temperatures of base resins in topcoatings A and B:

The base resin for the topcoating A must have a glass transition temperature higher by about 10° to about 100° C. than that for the topcoating B used in conjunction with the foregoing topcoating A. It is most preferred to use the resin for topcoating A having a glass transition temperature higher by about 20° to about 50° C. than that of the resin for topcoating B.

The base resin for the topcoating A has a glass transition temperature of generally about 20° to about 130° C., preferably about 40° to about 80° C. The base resin for the topcoating B has a glass transition temperature of generally about −30° to about 80° C., preferably about −10° to about 30° C. The former resin is selected from those having a glass transition temperature higher by about 10° to about 100° C. than that of the latter.

(2) Surface tensions of topcoatings A and B and/or inclusion of small amount of base resin for topcoating A or B in other topcoating A or B:

The difference of surface tension between the topcoatings A and B as measured upon application of the topcoatings A and B must be in the range as specified below in (a) and/or a small amount as described below in (b) of a base resin for one of topcoatings A and B must be incorporated into the other topcoating A or B.

(a) Surface tension of topcoatings A and B.

The difference in the surface tension between the topcoatings A and B as measured upon application is in the range of 0 to 4 dyne/cm, preferably 0 to 2 dyne/cm.

The use of topcoatings A and B having a surface tension in this range can produce coatings, even with the particles of the topcoatings A and B mixed together in the boundary area, having a surface free of cissing and dents and outstanding in smoothness. The surface tension of the topcoatings A and B can be easily adjusted in the conventional manner, for example, by adding a surface conditioner containing silicone resin, acrylic resin, silicone-modified acrylic resin or the like.

(b) Inclusion of small amount of base resin for top-coating A in topcoating B or vice versa:

The base resin for the topcoating B is added to the topcoating A; or the base resin for the top-coating A is added to the topcoating B; or the base resin for the topcoating B is added to the topcoating A and at the same time, the resin for the topcoating A is added to the topcoating B. Examples of suitable amounts of the base resin to be added are as follows:

(b-1) The base resin for the topcoating B is added to the topcoating A in an amount of 1 to 50 parts by weight, preferably 1 to 20 parts by weight, per 100 parts by weight of the base resin for the topcoating A.

(b-2) The base resin for the topcoating A is included into the topcoating B in an amount of 1 to 50 parts by weight, preferably 1 to 20 parts by weight, per 100 parts by weight of the base resin for the topcoating B.

(b 3) The base resin for the topcoating B is incorporated into the topcoating A in an amount of 1 to 50 parts by weight, preferably 1 to 15 parts by weight, per 100 parts by weight of the base resin for the top-coating A, and the base resin for the topcoating A is added to the topcoating B in an amount of 1 to 50 parts by weight, preferably 1 to 15 parts by weight, per 100 parts by weight of the base resin for the topcoating B.

When topcoatings A and B having the properties or compositions adjusted to fulfil the requirements (1) and (2) are applied to the base coat over the metal and plastics components of automotive outer parts, a coating area at or near between the metal and plastics component is formed in which the particles of the topcoatings A and B are mingled together and which, nevertheless, has a surface free of cissing and dents and excellent in smoothness.

There is no particular restriction on the method of applying topcoatings A and B in the present invention. However, since the topcoatings A and B are applied to the base coat which has not been cured yet, it is preferred to apply the topcoaings A and B with use of a spray coater such as an air spray, airless spray or coater for electrostatic coatings. While the topcoatings A and B can be simultaneously sprayed, for example, by a spray of the two-nozzle type, they may be separately applied. Since the base coat is formed with a thickness as small as possible as stated above, the topcoatings A and B must be sufficiently thickened to impart a desired degree of mechanical strength to the coatings. Their thickness is each in the range of 30 to 60μ, preferably 40 to 50μ, based on the thickness of cured coat.

According to the present invention, the base coat and topcoats thus applied are simultaneously cured by application of heat. While the heating temperature varies depending on the selection of raw materials for automotive outer parts, particularly, plastics, the composition of topcoatings, and other conditions, the coatings are preferably heated at a temperature of 100° to 150° C. for 20 to 40 minutes.

The present invention will be described below in more detail with reference to the following examples. In the Examples, the surface tension of the top-coatings A and B deposited over the base coat was measured upon application of the topcoatings A and B by the following method. The topcoating was discharged under the conditions as described below over several minutes. Excess of the topcoating flowing out from the layer thus deposited was collected into a bottle. The bottle was airtightly closed to prevent the volatilization of the solvent. The topcoating thus collected was maintained at 20° C. and its surface tension was measured by a measurement device of surface tension (device of Kyowa CBVP type, Model of A-1, product of Kyowa Kagaku Kabushiki Kaisha, Japan) three times. A mean value of the three measurements is indicated as the surface tension value (dyne/cm).

Spray gun: Winder-71 (trademark, product of Iwata Tosoki Kabushiki Kaisha, Japan)
Frequency of nozzle opening: 4 times
Air pressure: 4 kg/cm$^2$
Distance between the spray gun and the article to be coated: 30 cm
Wind speed in the booth: 0.5 to 0.8 m/sec

EXAMPLE 1

(I) Plastics component of automotive outer part

A primer containing urethane elastomer resin and having a gray color (trademark "Soflex No. 1000," product of Kansai Paint Company, Limited, Japan) was sprayed over an article of urethane plastics formed by reinforced-reaction injection molding and degreased by a trichloroethane vapor to a dry thickness of 15 to 20μ. The coated article was dried by being baked at 80° C. for 30 minutes to provide a plastics test piece.

(II) Metal component of automotive outer part

A steel sheet for automotive outer body components was surface-treated with "Bonderite #3114" (trademark, surface-treating agent of the zinc sulfate type produced by Nihon Parkerizing Co., Ltd., Japan) and a cationic electrodeposition coating composition (trademark "Elecron #900," product of Kansai Paint Company, Limited, Japan) was electrodeposited on the steel sheet thus surface-treated to a dry thickness of 25μ and baked at 180° C. for 30 minutes. A coating composition of the amino-alkyd resin type for an intermediate coat (trademark "AMILAC SEALER," product of Kansai Paint Company, Limited, Japan) was sprayed over the electrodeposited steel sheet to a dry thickness of 0 to 35μ and dried by being baked at 140° C. for 30 minutes to provide a test piece of steel sheet.

(III) Finish coating compositions (i) Base coat composition-1

Used as a base coat composition-1 was an enamel of metallic silver color (trademark "Soflex, No. 1400," product of Kansai Paint Company, Limited, Japan) for use in coating plastics comprising a vehicle chiefly containing polyester resin (base resin), amino resin (cross linking agent) and cellulose acetate butyrate (ii) Topcoat composition A-1 (for metal component)

A topcoat composition A-1 was prepared by mixing a clear coating composition for metal components containing as a vehicle acrylic resin (base resin having a glass transition temperature of 40° C.) and amino resin (cross linking agent) (trademark "Magicron," product of Kansai Paint Company, Limited, Japan) with 30 ppm of a surface tension conditioner of the silicone type (tradename "Silicone Oil KP-322," product of Shin-etsu Kagaku Kogyo Kabushiki Kaisha, Japan) and a surface tension conditioner of the acryl type (trademark "Modaflow," product of Monsanto Co., Ltd., U.S.A.) in an amount of 0.03 part by weight per 100 parts by weight of the vehicle. The surface tension of the topcoat composition A-1 as measured upon application was 27.5 dyne/cm.

(iii) Topcoat composition B-1 (for plastics component)

A topcoat composition B-1 was prepared by mixing a clear coating composition (trademark "Soflex 1600," product of Kansai Paint Company, Limited, Japan) for plastics components containing as a vehicle acrylic resin (base resin having a glass transition temperature of 0° C.) and amino resin (cross linking agent) with 10 ppm of "Silicone Oil KP-322" (the same as above) and "Modaflow" (the same as above) in an amount of 0.01 part by weight per 100 parts by weight of the vehicle. The surface tension of the topcoat composition B-1 as measured upon application was 25.5 dyne/cm.

(IV) Application of coatings

The base coat composition-1 was applied over an article to be coated which was assembled from the two test pieces pretreated above in (I) and (II) to a dry thickness of 15 to 20μ and was flashed off over 5 to 10 minutes. The dried article was coated with the topcoat composition A-1 for the metal component and with the topcoat composition B-1 for the plastics component simultaneously by a spray gun of the 2-nozzle type each to a dry thickness of 45μ. The base coat and topcoats over the article were cured by being set at room temperature for 10 minutes and heated to 120° C. over 30 minutes. Table 1 below shows properties of the coatings thus formed.

EXAMPLE 2

The same procedure as in Example 1 was repeated with the exception of using, in place of the topcoat composition A-1, a topcoat composition A-2 prepared for metal components by changing the amount of "Silicone Oil KP-322" (the same as above) to 40 ppm and the amount of "Modaflow" (the same as above) to 0.04 part by weight. The surface tension of the topcoat composition A-2 as measured upon application was 26.5 dyne/cm. Table 1 below shows properties of the coatings thus obtained.

EXAMPLE 3

The same procedure as in Example 1 was repeated with the exception of replacing the topcoat composition A-1 with a topcoat composition A-3 for metal components prepared by changing the amount of "Silicone Oil KP-322" (the same as above) to 50 ppm and the amount of "Modaflow" (the same as above) to 0.05 part by weight. The surface tension of the topcoat composition A-3 as measured upon application was 26.0 dyne/cm. Table 1 below lists properties of the coatings thus formed.

COMPARISON EXAMPLE 1

The same procedure as in Example 1 was repeated with the exception of using two topcoat compositions respectively for metal components and for plastics components each containing none of "Silicone Oil KP-322" (the same as above) and "Modaflow" (the same as above) present in the topcoat compositions A-1 and B-1. The surface tensions of the topcoat compositions as measured upon application were 26 dyne/cm on the plastics component and 31 dyne/cm on the metal component. Table 1 below shows properties of the coatings thus formed.

EXAMPLE 4

The same procedure as in Example 1 was followed with the exception of using, in place of the topcoat composition A-1, a topcoat composition A-4 for metal components prepared by incorporating into the topcoat composition A-1 the base resin (acrylic resin) for the topcoat composition B-1 in an amount of 5 parts by weight per 100 parts by weight of the base resin (acrylic resin) for the topcoat composition A-1. Table 1 below shows properties of the coatings thus deposited.

EXAMPLE 5

The same procedure as in Example 1 was repeated with the exception of using, in place of the topcoat composition B-1, a topcoat composition B-2 for plastics components prepared by incorporating into the topcoating B 1 the base resin (acrylic resin) for the topcoat composition A-1 in an amount of 5 parts by weight per 100 parts by weight of the base resin (acrylic resin) for the topcoat composition B-1. Table 1 below indicates properties of the coatings thus produced.

EXAMPLE 6

The same procedure as in Example 1 was repeated with the exception of using the topcoat composition A-4 for metal components and the topcoat composition B-2 for plastics components. Table 1 below shows properties of the coatings thus produced.

TABLE 1

| | Example | | | | | | |
| --- | --- | --- | --- | --- | --- | --- | --- |
| | 1 | 2 | 3 | 4 | 5 | 6 | Com. Ex. 1 |
| Compatibility of sprayed particles with each other in topcoats | Good | Good | Good | Good | Good | Good | Poor |

TABLE 1-continued

|  | Example | | | | | | Com. Ex. 1 |
| --- | --- | --- | --- | --- | --- | --- | --- |
|  | 1 | 2 | 3 | 4 | 5 | 6 |  |
| State of boundary part in between two topcoats | Good | Good | Good | Good | Good | Good | Cissing occurred |
| Appearance of finish coatings | Good | Good | Good | Good | Good | Good | Defective |
| Color difference (NBS) *1 | 0.1 | 0.1 | 0.1 | 0.1 | 0.1 | 0.1 | 0.2 |

Remark:
*1 Color difference as measured between coatings formed according to JIS Z 8730 over plastics and metal components

What we claim is:

1. A method of coating automotive outer parts having components made of metals and those made of plastics by a system of two coating steps and one baking step, the method comprising the steps of coating the surface of the metal and plastics components with a single base coat composition; coating the base coat over the metal component with a clear topcoat composition prepared for metal components and the base coat over the plastics component with a clear topcoat composition prepared for plastics components; and thermally curing the base coat and the topcoats, the two topcoat compositions being capable of fulfilling the following requirements:
   (i) the base resin for the topcoat composition for the metal components has a glass transition temperature higher by about 10° to about 100° C. than the base resin for the topcoat composition for plastics components; and
   (ii) (a) there is a difference of 0 to 4 dyne/cm in surface tension as measured upon application between the topcoat composition for metal components and the topcoat composition for plastics components; and/or (b) the topcoat composition for metal components contains 1 to 50 parts by weight of the base resin for the topcoat composition for plastics components per 100 parts by weight of the base resin for the topcoat composition for metal components and/or the topcoat composition for plastics components contains 1 to 50 parts by weight of the base resin for the topcoat composition for metal components per 100 parts by weight of the base resin for the topcoat composition for plastics components.

2. A coating method as defined in claim 1 in which the glass transition temperature of the base resin for the topcoat composition for metal components is higher by about 20° to about 50° C. than that of the base resin for the topcoat composition for plastics components.

3. A coating method as defined in claim 1 in which the topcoat deposited on the base coat over the metal components has a surface tension which is different by 0 to 2 dyne/cm from that of the topcoat deposited on the base coat over the plastics components.

4. A coating method as defined in claim 1 in which the topcoat composition for metal components contains 1 to 20 parts by weight of the base resin for the topcoat composition for plastics components per 100 parts by weight of the base resin for the topcoat composition for metal components.

5. A coating method as defined in claim 1 in which the topcoat composition for plastics components contains 1 to 20 parts by weight of the base resin for the topcoat composition for metal components per 100 parts by weight of the base resin for the topcoat composition for plastics components.

6. A coating method as defined in claim 1 in which the topcoat composition for metal components contains 1 to 15 parts by weight of the base resin for the topcoat composition for plastics components per 100 parts by weight of the base resin for the topcoat composition for metal components and the topcoat composition for plastics components contains 1 to 15 parts by weight of the base resin for the topcoat composition for metal components per 100 parts by weight of the base resin for the topcoat composition for plastics components.

7. A coating method as defined in claim 1 in which the base coat has a dry thickness of 10 to 20µ.

8. A coating method as defined in claim 1 in which the topcoat composition for metal components and the topcoat composition for plastics components are capable of giving topcoats each having a dry thickness of 30 to 60µ.

* * * * *